Figure 1:
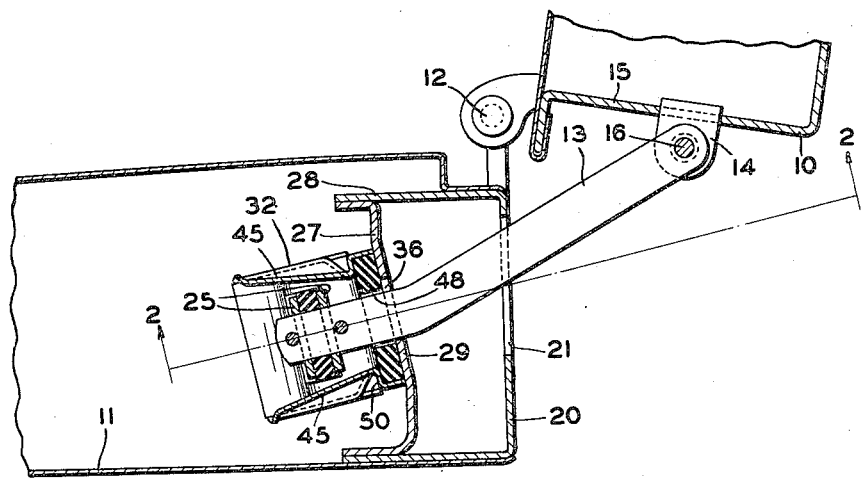

July 25, 1939.  R. I. SCHONITZER  2,166,970

COMBINED DOOR-CHECKING AND DOOR-HOLDING DEVICE

Filed July 27, 1938    2 Sheets-Sheet 1

INVENTOR
RUDOLPH I. SCHONITZER
BY
Hyde, Higley & Meyer
ATTORNEYS.

July 25, 1939.  R. I. SCHONITZER  2,166,970

COMBINED DOOR-CHECKING AND DOOR-HOLDING DEVICE

Filed July 27, 1938   2 Sheets-Sheet 2

INVENTOR
RUDOLPH I. SCHONITZER
BY
Hyde, Higley & Meyer
ATTORNEYS.

Patented July 25, 1939

2,166,970

UNITED STATES PATENT OFFICE 2,166,970

COMBINED DOOR-CHECKING AND DOOR-HOLDING DEVICE

Rudolph I. Schonitzer, Shaker Heights, Ohio

Application July 27, 1938, Serial No. 221,571

12 Claims. (Cl. 16—86)

This invention relates to a device for checking the opening movement of a hinged door, such as an automobile door, or for releasably holding or retaining such a door in a predetermined open position, or for accomplishing both of such functions.

The general object of the present invention is the provision of a device of the type described which is of simple and inexpensive construction, of strong and sturdy character, and which performs in a particularly effective manner its door-checking function or its door-holding function or its combined door-checking and door-holding functions.

A more specific object of the present invention is the provision of a device of the type described which includes (a) checking parts or (b) retaining parts or (c) checking and retaining parts, said parts being adapted to be secured to and enclosed by a hinged door structure or a supporting structure therefor, and a co-operating arm assembly adapted to be secured to the other of such structures, the arm of such assembly having flexible and resilient means for cooperation with such checking parts in checking the opening movement of such door structure or for co-operation with such retaining parts in releasably holding or retaining such a door structure in a predetermined open position, or for cooperation with such checking parts and such retaining parts in the accomplishment of both of such door-checking and door-holding functions.

Another more specific object of the present invention is the provision of a device of the type described in which the flexible and resilient means of the arm assembly thereof is adapted to be flexed or bowed in opposite directions, in one direction during opening movement of such a door structure and in the opposite direction during closing movement of such a door structure.

Other objects of the present invention are in part obvious and in part will appear more in detail hereinafter.

For the disclosure of the present invention, the accompanying drawings illustrate and the present specification describes two embodiments of a device for yieldingly checking the opening movement of a hinged door, such as an automobile door, and for releasably holding or retaining such door in a predetermined open position, and an explanation will hereinafter be made as to the way in which each of two devices here illustrated may be converted into either a door-checking device only or a door-holding device only.

Figure 2:
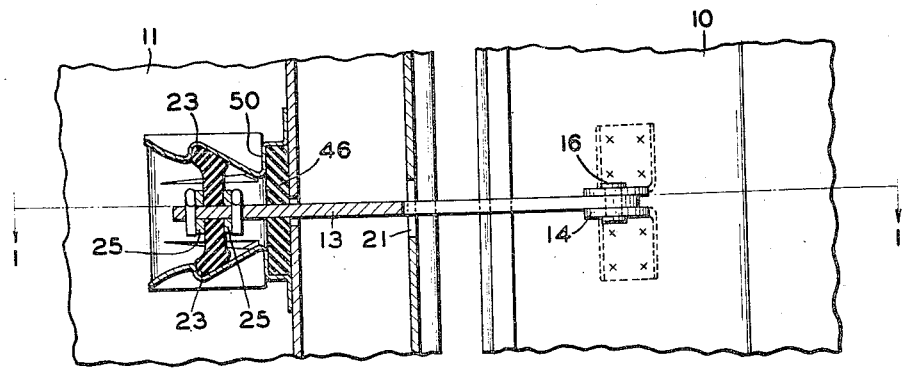
Figure 3:
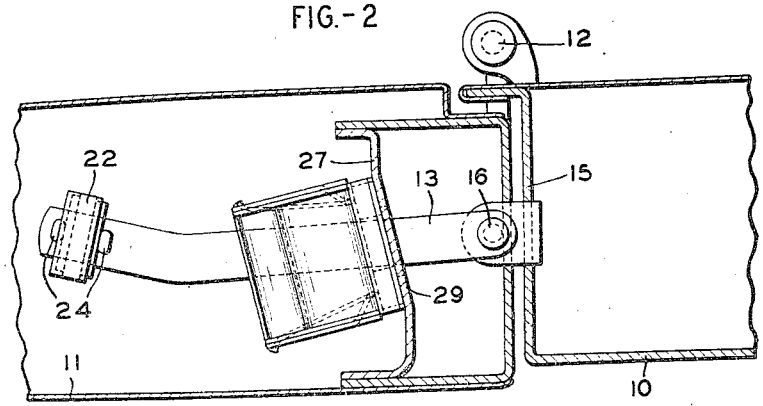
Figure 4:
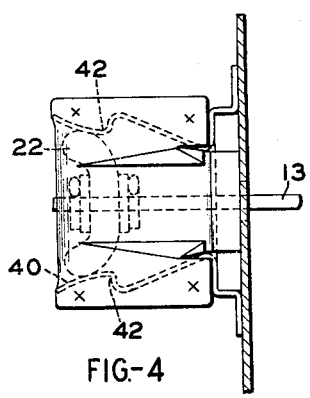
Figure 6:
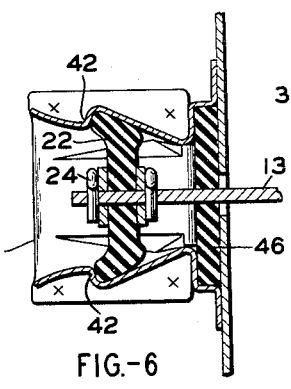
Figure 7:
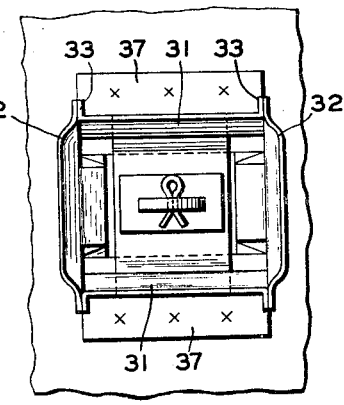
Figure 5:
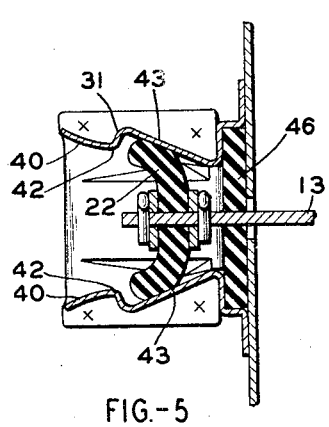
Figure 8:
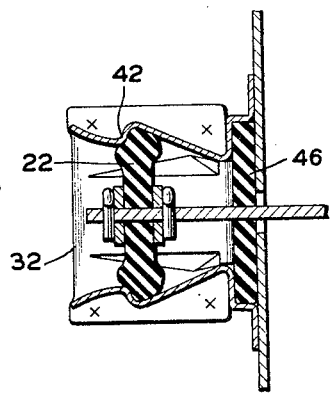
Figure 9:
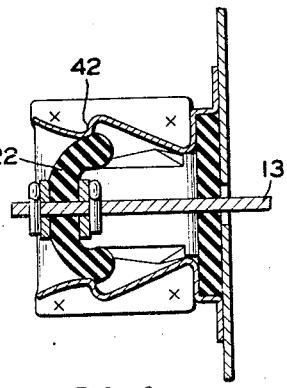
Figure 11:
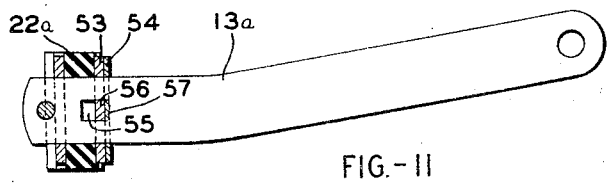
Figure 10:
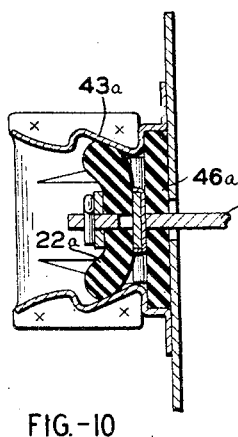

In the accompanying drawings, Fig. 1 is a horizontal sectional view, on the line 1—1, Fig. 2, of a portion of an automobile door and a portion of an automobile body on which such door is hinged, said door and said body having associated therewith, for door-checking and door-holding purposes, a device constructed in accordance with one embodiment of the present invention, the door being in the predetermined open position in which it may be releasably held or retained by the present device; Fig. 2 is a vertical view thereof, partly in section and partly in elevation, the view being on the line 2—2, Fig. 1; Fig. 3 is a view similar to Fig. 1 but showing the door in closed position, the door-checking and door-holding device being in elevation; Figs. 4 to 9 inclusive are views of this particular embodiment of the present door-checking and door-holding device, with the flexible and resilient checking and retainable member of the arm shown in some of the positions which such member occupies within the box-like checking and retaining unit during opening and closing movements of the hinged door and when said door is being releasably held or retained in a predetermined open position, and as to such views, Fig. 4 is a side elevation of said checking and retaining unit, with the checking and retainable arm member (shown in dotted lines) in the flexed position which it occupies when initially entering such unit; Fig. 5 is a similar view, although in section, with said checking and retainable arm member in the flexed position which it occupies within said checking and retaining unit during the checking of the opening movement of the hinged door; Fig. 6 is a view similar to Fig. 5 but showing said checking and retainable arm member in the position which it occupies within said checking and retaining unit during the releasable holding of such door in a predetermined open position; Fig. 7 is an end view of the parts as shown in Fig. 6; Fig. 8 is a view similar to Fig. 6 but showing the checking and retainable arm member in the position which it occupies within the checking and retaining unit upon initiation of closing movement of the hinged door; and Fig. 9 is a view similar to Fig. 8 but showing the flexed or bowed position of the checking and retainable arm member within the checking and retaining unit just before it leaves such unit, the direction of bowing or flexing of such member being opposite to that shown in Figs. 4 and 5; and Figs. 10 to 14 inclusive are views of a door-checking and door-holding device constructed in accordance with another embodiment of the present invention, and as to such views, Fig. 10 is a view similar to Fig. 5, with the checking and retainable arm member in the flexed position which it occupies within the checking and retaining unit during door-checking action; Fig. 11 is a view of the arm assembly of this modified form of door-checking and door-holding device, the checking and retainable member of such arm assembly and the opposed abutment means for said member being in section; and Figs. 12 to 14 inclusive are views of the inner abutment means for such checking and retainable arm member, Fig. 12 being a plan view of such inner abutment means; Fig. 13 is an end view thereof; and Fig. 14 is a cross-sectional view thereof, on the line 14—14, Fig. 12.

Before the present invention is described in detail, it is to be understood that such invention is not limited to the details of construction or the specific arrangement of parts herein illustrated or described, as the invention obviously may take other forms, including a reversal of the parts thereof. It also is to be understood that the phraseology or terminology herein employed is for the purpose of description and not of limitation, as there is no intention and no desire to limit the present invention, as herein disclosed and as defined in the appended claims, beyond the requirements of the prior art.

For the illustration of two embodiments of the present invention, there is shown in the accompanying drawings a portion of a standard metal automobile door 10 and a portion of a standard metal automobile body 11 on which such door is mounted by suitable hinges 12 of either the concealed or the exposed type, only one of which hinges (of the exposed type) being here shown. Associated with said door and said body, for checking the opening movement of said door when said door reaches a predetermined open position and for releasably holding or retaining said door in a predetermined open position, is a concealed type door-checking and door-holding device constructed in accordance with one embodiment of the present invention.

As will hereinafter more fully appear, each of the two door-checking and door-holding devices here illustrated comprises (a) a checking and retaining unit having suitable checking means and suitable retaining means, and (b) an arm assembly having a rigid arm on which is mounted suitable checking and retainable means, said checking and retainable means being of flexible and resilient character and being adapted for cooperation with the checking means of said checking and retaining unit in checking the opening movement of a hinged door, such as the door 10, when said door reaches a predetermined open position, and also being adapted for cooperation with the retaining means of said unit in releasably holding or retaining such a door in a predetermined open position.

The checking and retaining unit of each of the devices here illustrated is adapted to be rigidly secured to and enclosed by either a door structure, such as the automobile door 10, or the supporting structure on which such door structure is hinged, such as the automobile body 11, and the rigid arm of the arm assembly of each of the present devices is adapted to be pivotally secured to the other of said structures, with said arm extending into the structure to which said checking and retaining unit is secured and the checking and retainable means of said arm being enclosed by such last mentioned structure, for door-checking and door-holding cooperation with said checking and retaining unit.

In the embodiment of the invention illustrated in Figs. 1 to 9 inclusive, the checking and retaining unit is rigidly secured to and enclosed by the automobile body 11, and the rigid arm 13 of the arm assembly is pivotally secured to the automobile door 10. For the pivotal securement of such arm to said automobile door, a suitable two-part bracket 14 is here spot-welded or otherwise rigidly secured to the side edge wall 15 of the door 10, at its hinge side, and on a pin 16 carried by said bracket is pivotally mounted one end of said arm 13, the arm here shown being of generally flat form and of metal or other suitable material. In the jamb wall 20 of the automobile body 11 is a suitable slot 21 through which said arm extends and on the free end portion of said arm, within said automobile body, is suitably mounted the checking and retainable means 22 of the present door-checking and door-holding device.

As heretofore pointed out, said checking and retainable means 22 is of flexible and resilient character, and as will hereinafter appear, said means is flexed or bowed in one direction during opening movement of the door 10 and is flexed or bowed in the opposite direction during closing movement of such door. Although said checking and retainable means may be of any suitable form, construction and material, it is here shown as a one-piece rubber member, said member being of generally rectangular shape in plan view, with its longitudinal axis transversely disposed relative to the general plane of the arm 13 on which it is mounted, and of generally flat form, although, if desired and as here shown, its end edge portions 23 may be somewhat thickened or enlarged.

The checking and retainable member 22 is mounted, intermediate its end edge portions 23 and preferably medially thereof, on the free end portion of the arm 13, and as here shown, a suitable slot is provided in the medial portion of such checking and retainable member for the extension therethrough of the free end portion of said arm 13. In this embodiment of the invention illustrated in Figs. 1 to 9 inclusive, the checking and retainable member 22 is secured on the free end portion of the arm 13 between two fixed abutments, such as the simple cotter pins 24 there shown, said cotter pins being secured in suitable apertures with which such arm free end portion is provided. If desired and as here shown, metal abutment plates 25 or the like may be interposed between said cotter pins and the two faces of the medial portion of said checking and retainable member 22, for the more effective flexing or bowing of such member, the abutment plates here shown being of generally rectangular form, with the longitudinal axes thereof transversely disposed relative to the corresponding axis of such checking and retainable member.

Although the checking and retaining unit of the door-checking and door-holding device of Figs. 1 to 9 inclusive may be secured directly to the jamb wall 20 of the automobile body 11 (in which event the arm bracket 14 would be extended inwardly into the door 10 from the side edge wall 15 thereof, rather than extended outwardly from such edge wall, as here shown), such checking and retaining unit is here secured to a transverse partition 27 with which said automobile body is suitably provided. As here shown (see Figs. 1 and 3), the partition 27 is a simple metal member spot-welded or otherwise rigidly secured to the side edge flanges 28 of the body jamb wall 20, the disposition of the intermediate portion 29 of said partition, to which portion such checking and retaining unit is secured, preferably being somewhat inclined relative to said body jamb wall 20, as shown.

As clearly illustrated in the accompanying drawings (see Fig. 7, particularly), the checking and retaining unit of the device of Figs. 1 to 9 inclusive is of box-like form, said unit being provided with two opposed side walls 31, for checking and retaining cooperation with the checking and retainable member 22, and with two opposed side walls 32, for guiding cooperation with said checking and retainable member. For increased strength and rigidity, the four walls of this box-like unit are preferably connected at their side edges, and in this particular embodiment of the present invention, the two checking and retaining side walls 31 are provided with laterally extending side edge flanges 33, to which are spot welded or otherwise suitably connected the side edge portions of the two guiding side walls 32, as best shown in Fig. 7.

For the extension therethrough of the arm 13, the body partition portion 29 is provided with a suitable slot 36, (see Figs. 1 and 2) and the box-like checking and retaining unit is so secured to such partition portion that the arm-receiving slot 36 of such portion is centrally located relative to said unit. Although any suitable means may be utilized in rigidly securing such box-like checking and retaining unit to such partition portion 29, the two checking and retaining side walls 31 of said unit are here provided with suitable base flanges 37 which are spot-welded or otherwise rigidly secured thereto.

As clearly illustrated in the accompanying drawings (see Fig. 5, for example), the two checking and retaining side walls 31 of the box-like checking and retaining unit include, intermediate their side edges, two oppositely disposed outer portions 40 which provide therebetween a restricted neck or passageway to (a) the two oppositely disposed retaining shoulders 42 of such side walls and to (b) the two oppositely disposed inwardly inclined or inwardly tapered checking portions 43 thereof, said retaining shoulders, which preferably are relatively abrupt, lying between such neck portions 40 and such checking portions 43. To facilitate the entrance of the checking and retainable member 22 of the arm 13 into said box-like checking and retaining unit, the neck portions 40 of the side walls 31 of such unit may be, and preferably are, of outwardly flaring form, as here shown. Also as clearly illustrated in the accompanying drawings (see Figs. 1 and 7, for example), the two guiding side walls 32 of said box-like checking and retaining unit are provided, intermediate their side edges, with two oppositely disposed guiding portions 45, of inwardly inclined or inwardly tapered character, the guiding portions 45 thus provided being adapted for cooperation with the side edges of the checking and retainable member 22 of the arm 13 in guiding such member into and out of said checking and retaining unit.

In the embodiment of the invention illustrated in Figs. 1 to 9 inclusive, the main guiding means for the arm 13 (and hence for the checking and retainable member 22 mounted thereon for movement therewith) is a guiding and cushioning pad 46 which, in such embodiment of the invention, is located within the box-like checking and retaining unit, at the base of the oppositely spaced checking portions 43 thereof. For the extension therethrough of the arm 13, said guiding and cushioning pad 46 is provided with a suitable slot 48, and the securement of the checking and retaining unit to the intermediate portion 29 of the metal body partition 27 is such that the arm-receiving slot 48 of said guiding and cushioning pad is in alignment with the arm-receiving slot 36 of such body partition. As here shown, the cross-dimensional size of the arm-receiving slot 48 of the guiding and cushioning pad 46 is less than that of the partition slot 36, with the result that the arm 13 is effectively prevented from laterally engaging said metal body partition. Inasmuch as the guiding and cushioning pad 46 is of yieldable material, such as of rubber or the like, any lateral movement of the arm 13, within the slot 48 of such pad, is effectively cushioned.

In the box-like checking and retaining unit of the door-checking and door-holding device of Figs. 1 to 9 inclusive, a suitable cavity is provided at the base of such unit for the reception of the guiding and cushioning pad 46 (see Figs. 1 and 2), with the result that upon the securement of such unit to the intermediate portion 29 of the body partition 27, said guiding and cushioning pad is securely held against such body partition portion by the shoulders 50 with which the four side walls of said unit are here provided.

As clearly indicated in the accompanying drawings, the length of the checking and retainable member 22 of the arm 13 relative to the width of the neck or passageway between the oppositely spaced neck portions 40 of the checking and retaining unit and relative to the width of the space between the checking portions 43 of said unit is such that said checking and retainable member is flexed or bowed, upon being moved by the arm 13 into such neck or passageway and into such space, the direction in which such checking and retainable member is flexed or bowed depending upon the direction in which such member is moved by said arm.

Upon opening swinging movement of the door 10, the checking and retainable member 22 is drawn or pulled by its arm 13 into the box-like checking and retaining unit, said checking and retainable member being effectively guided into such unit by the inter-engagement of the arm 13 and the guiding and cushioning pad 46 and by the inter-engagement of the side edges of the checking and retainable member and the guiding portions 45 of said unit. Due to the provision of such unit guiding portions 45, there is no liability of damage, by abrasive action or otherwise, to the guiding and cushioning pad 46 by the movement of the arm 13 through the slot 48 thereof, upon the entrance into the box-like checking and retaining unit of the checking and retainable member 22 of the arm 13, as will be readily understood.

As shown in Fig. 4, the checking and retainable member 22 assumes, upon entering the restricted neck or passageway of the box-like checking and retaining unit, between the oppositely spaced neck retaining portions 40 thereof, a flexed or bowed condition, and as a result, said neck portions exert a slight dragging effect upon the end edges 23 of such checking and retainable member 22. The dragging effect thus produced is not sufficient, however, to noticeably retard the opening movement of the door 10, when said door is opened in the usual or normal manner.

Upon continued door-opening movement, the checking and retainable member 22 is drawn or pulled by its arm 13 further into the checking and retaining unit, between the inwardly inclined or inwardly tapered checking portions 43 of such unit, with the result that said member is flexed or bowed to a greater extent, as shown in Fig. 5, and with the consequent production of a door-checking action which effectively checks further opening movement of said door.

Preferably, and as here shown, the two oppositely spaced checking portions 43 of the checking and retaining unit are inclined or tapered inwardly a sufficient extent to effectively check opening movement of the door 10 without causing the inner cotter pin abutment 24 for such member to engage or contact the arm guiding and cushioning pad 46, as will be readily understood.

Upon manual release of the door 10, the checking and retainable member 22 automatically assumes, due to its inherent resiliency, the position shown in Figs. 2 and 6, in which position it is releasably held or retained by the relatively abrupt retaining shoulders 42 of the checking and retaining unit, and the door 10, due to the securement thereto of the arm 13, is consequently releasably held or retained in the open position shown in Figs. 1 and 2. Although the checking and retainable member 22 may have a flexed or bowed condition when in the releasably retained position shown in Figs. 2 and 6, in the embodiment of the invention illustrated in Figs. 1 to 9 inclusive, said member is substantially unflexed or unbowed when in such position, as clearly shown in Figs. 2 and 6.

Upon closing swinging movement of the door 10, from the predetermined open position in which it may be releasably held or retained by the present door-checking and door-holding device, a pushing force is applied through the arm 13 to the medial portion of the checking and retainable member 22. Upon the initiation of such pushing force, or in other words, upon initiation of door-closing movement, the checking and retainable member 22 assumes the distorted position shown in Fig. 8, and upon continued door-closing movement, said member enters the restricted neck or passageway between the oppositely spaced neck portions 40 and therein assumes the reversely flexed or bowed position shown in Fig. 9. Thereafter, the checking and retainable member 22 leaves the box-like checking and retainable unit and the door 10 then may be swung freely or unhampered to its closed position, as shown in Fig. 3.

It will thus be apparent that the present device includes, for door-checking and door-holding cooperation with the box-like checking and retaining unit, a checking and retainable member 22 of such flexible and resilient character that it may be readily flexed or bowed in two directions, in one direction, as shown in Figs. 4, 7 and 10, during opening movement of the door 10, and in the opposite direction, as shown in Fig. 9, during closing movement of said door.

As heretofore pointed out, in the embodiment of the invention illustrated in Figs. 1 to 9 inclusive, the checking and retainable member 22 is mounted on the free end portion of the arm 13 between two fixed abutments, there shown as simple cotter pins 24. If desired, however, the inner abutment for such member 22 may have limited sliding movement along such arm, in response to and in accordance with distortion of the rubber or other flexible and resilient material of which the member 22 is made.

Figure 12:
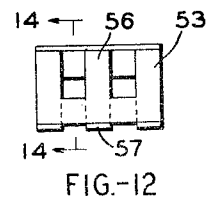
Figure 13:
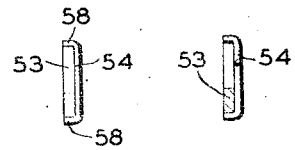
Figure 14:

In the embodiment of the invention illustrated in Figs. 10 to 14 inclusive, therefore, the inner abutment for the retainable and checking member 22a is of such movable character, the inner abutment there shown comprising two superposed and cooperatively related sheet metal abutment plates 53 and 54. As best shown in Figs. 12 to 14 inclusive, each of the two abutment plates 53 and 54 is provided with three free-ended tongues, namely, with two end tongues and with an intermediate tongue spaced therefrom. In the free end portion of the arm 13a, there is a longitudinally disposed slot 55 for the reception of the intermediate tongues of the two abutment plates 53 and 54, and the slidable movement of said abutment plates along such arm end portion is limited, of course, by the length of such slot.

The two abutment plates 53 and 54 are assembled with the arm 13a from opposite side faces thereof, the intermediate tongue 56 of abutment plate 53 extending through the arm slot 55 in one direction and the intermediate tongue 57 of abutment plate 54 extending through such arm slot in the opposite direction, and the end tongues of the two abutment plates being in straddling relation relative to the arm 13a. To prevent accidental displacement of either of these two abutment plates, the abutment plate 54 here shown is provided with laterally extending side flanges 58, between which the abutment plate 53 is confined, the abutment plate 54 being initially made of increased width for the provision of such side flanges. In the removal of these two abutment plates from the arm 13a, it is merely necessary to so separate such plates as to free the plate 53 from its retention by the side flanges 58 of plate 54, after which either or both abutment plates may be readily removed by simple sidewise movement thereof. Accidental escape of either abutment plate is, however, effectively prevented by the pressure effective upon such plates by the retainable and checking member 22a, pressure which normally confines the abutment plate 53 between the side flanges 58 of the abutment plate 54 and which normally maintains both of said abutment plates at that end of the arm slot 55 which is farther from the fixed abutment for such member.

In this second embodiment of the present invention, the depth or length of the two oppositely spaced checking portions 43a of the checking and retaining unit is less than that of the two oppositely spaced checking portions 43 of the checking and retaining unit of the first embodiment of the invention. As a result, in such second embodiment of the present invention, the inner abutment means for the checking and retainable member 22a engages the arm guiding and cushioning pad 46a of the checking and retaining unit in checking door-opening movement, as clearly shown in Fig. 10.

From the foregoing description of the two embodiments of the present invention here illustrated, it will be apparent that the two devices constituting such embodiments are each adapted to perform, in an exceedingly efficient and practical manner, the two-fold function of checking the opening movement of a hinged door, such as an automobile door, and of releasably holding or retaining such a door in a predetermined open position.

If a door-checking device only is desired, it is merely necessary to eliminate the retaining shoulders 42 of the device of Figs. 1 to 9 inclusive or the retaining shoulders 42a of the device of Figs. 10 to 14 inclusive, to eliminate the door-holding feature thereof, as will be readily understood. If a door-holding device only is desired, it is merely necessary to eliminate from the device of Figs. 1 to 9 inclusive the checking portions 43 thereof or eliminate from the device of Figs. 10 to 14 inclusive the checking portions 43a thereof, and to otherwise so check the opening movement of the door with which the door-holding device is used that the flexible and resilient member of such device and/or the inner abutment means for such member will not contact or engage the arm guiding and cushioning pad of such device, all as will be readily understood.

Although in both of the embodiments of the invention here illustrated, the oppositely spaced neck portions (designated by the reference numeral 40 in the embodiment of Figs. 1 to 9 inclusive), and the restricted neck or passageway provided thereby, are of material or substantial length or depth, it is to be understood that said neck portions may be of such character, as to length or depth, as to provide a neck or passageway in the form of a mere opening. In the appended claims, therefore, the term "neck" and the term "passageway" are to be construed or interpreted as covering and including not only a neck or passageway of material or substantial length or depth but also, a neck or passageway in the form of a mere opening, having substantially no length or depth.

Further features and advantages of the present invention will be readily apparent to those skilled in the art to which this invention relates.

What I claim is:

1. A device for releasably retaining or holding in a predetermined open position a door structure hinged on a supporting structure, said device comprising retaining means adapted to be secured to one of said structures and having a retaining portion and a passageway thereto, an arm adapted to be associated with the other of said structures and to extend through such passageway, and flexible resilient retainable means carried by said arm for cooperation with said retaining portion in releasably retaining the door structure in a predetermined open position, said retaining means and said retainable means being relatively movable in opposite directions during opening and closing movements of said door structure and the passageway of said retaining means having a cross-dimension less than the maximum corresponding cross-dimension of said retainable means, with the result that during opening and closing movements of said door structure said retainable means is flexed or bowed in opposite directions while in such passageway.

2. A device for releasably retaining or holding in a predetermined open position a door structure hinged on a supporting structure, said device comprising retaining means adapted to be secured to one of said structures and having oppositely spaced retaining portions and a passageway thereto, an arm adapted to be associated with the other of said structures and to extend through such passageway and between such retaining portions, and flexible resilient retainable means carried by said arm for cooperation with said retaining portions in releasably retaining the door structure in a predetermined open position, said retaining means and said retainable means being relatively movable in opposite directions during opening and closing movements of said door structure and the passageway of said retaining means having a cross-dimension less than the maximum corresponding cross-dimension of said retainable means, with the result that during opening and closing movements of said door structure said retainable means is flexed or bowed in opposite directions while in such passageway.

3. A device for releasably retaining or holding in a predetermined open position a door structure hinged on a supporting structure, said device comprising retaining means adapted to be secured to one of said structures and having a retaining portion and a passageway thereto, an arm adapted to be associated with the other of said structures and to extend through such passageway, and flexible resilient retainable means carried by said arm for cooperation with said retaining portion in releasably retaining the door structure in a predetermined open position, said retaining means and said retainable means being relatively movable in opposite directions during opening and closing movements of said door structure and the passageway of said retaining means having varying cross-dimensions with the minimum one thereof less than the maximum corresponding cross-dimension of said retainable means, with the result that during opening and closing movements of said door structure said retainable means is flexed or bowed in opposite directions while in such passageway.

4. A device for checking the opening movement of a door structure hinged on a supporting structure, said device comprising checking means adapted to be secured to one of said structures and having oppositely spaced inwardly inclined checking portions and also having a passageway thereto, an arm adapted to be associated with the other of said structures and to extend through such passageway and between said checking portions, and flexible resilient means carried by said arm for cooperation with said checking portions in checking the opening movement of the door structure, the minimum distance between said checking portions being materially less than the maximum corresponding cross-dimension of said flexible resilient means, with the result that said flexible resilient means has a flexed or bowed condition when in checking cooperation with said checking portions, said checking means and said flexible resilient means being relatively movable in opposite directions during opening and closing movements of said door structure and the passageway of said checking means having a cross-dimension less than the maximum corresponding cross-dimension of said flexible resilient means, with the result that during opening and closing movements of said door structure said flexible resilient means is flexed or bowed in opposite directions while in such passageway.

5. A device for checking the opening movement of a door structure hinged on a supporting structure and for releasably retaining or holding such door structure in a predetermined open position, said device comprising checking and retaining means adapted to be secured to one of said structures and having a checking portion and a retaining portion, said checking and retaining means also having a passageway to said checking portion and said retaining portion, an arm adapted to be secured to the other of said structures and to extend through said passageway, and flexible resilient retainable means carried by said arm for cooperation with said checking portion in checking the opening movement of said door structure and for cooperation with said retaining portion in releasably retaining said door structure in a predetermined open position, said checking and retaining means and said retainable means being relatively movable in opposite directions during opening and closing movements of said door structure and the passageway of said checking and retaining means having a cross-dimension less than the maximum corresponding cross-dimension of said retainable means, with the result that during opening and closing movements of said door structure said retainable means is flexed or bowed in opposite directions while in such passageway.

6. A device for checking the opening movement of a door structure hinged on a supporting structure and for releasably retaining or holding such door structure in a predetermined open position, said device comprising checking and retaining means adapted to be secured to one of said structures and having oppositely spaced checking portions of inwardly converging character and a retaining portion, said checking and retaining means also having a passageway to said checking portions and said retaining portion, an arm adapted to be secured to the other of said structures and to extend through said passageway and between said checking portions, and flexible resilient retainable means carried by said arm for cooperation with said checking portions in checking the opening movement of said door structure and for cooperation with said retaining portion in releasably retaining said door structure in a predetermined open position, said checking and retaining means and said retainable means being relatively movable in opposite directions during opening and closing movements of said door structure and the passageway of said checking and retaining means having a cross-dimension less than the maximum corresponding cross-dimension of said retainable means, with the result that during opening and closing movements of said door structure said retainable means is flexed or bowed in opposite directions while in such passageway, the minimum distance between said checking portions being materially less than the maximum corresponding cross-dimension of said retainable means so that said retainable means also has a flexed or bowed condition while in checking cooperation with said checking portions.

7. A device for checking the opening movement of a door structure hinged on a supporting structure and for releasably retaining or holding such door structure in a predetermined open position, said device comprising checking and retaining means adapted to be secured to one of said structures and having two oppositely spaced walls provided with three sets of opposite portions, one set of such wall portions being checking portions, another set of such wall portions being retaining portions, and the third set of such wall portions being neck portions which provide therebetween a passageway to said checking portions and said retaining portions, an arm adapted to be secured to the other of said structures and to extend through said passageway and between said checking portions and between said retaining portions, and flexible resilient retainable means carried by said arm for cooperation with said checking portions in checking the opening movement of said door structure and for cooperation with said retaining portions in releasably retaining said door structure in a predetermined open position, said checking and retaining means and said retainable means being relatively movable in opposite directions during opening and closing movements of said door structure and the passageway of said checking and retaining means having a cross-dimension less than the maximum corresponding cross-dimension of said retainable means, with the result that during opening and closing movements of said door structure said retainable means is flexed or bowed in opposite directions while in such passageway.

8. A device for checking the opening movement of a door structure hinged on a supporting structure and for releasably retaining or holding such door structure in a predetermined open position, said device comprising checking and retaining means adapted to be secured to one of said structures and having two oppositely spaced walls provided with three sets of opposite portions, one set of such wall portions being checking portions, another set of such wall portions being retaining portions, and the third set of such wall portions being neck parts which provide therebetween a passageway to said checking portions and said retaining portions, said retaining portions being located between said passageway and said checking portions, an arm adapted to be secured to the other of said structures and to extend through said passageway and between said checking portions and between said retaining portions, and flexible resilient retainable means carried by said arm for cooperation with said checking portions in checking the opening movement of said door structure and for cooperation with said retaining portions in releasably retaining said door structure in a predetermined open position, said checking and retaining means and said retainable means being relatively movable in opposite directions during opening and closing movements of said door structure and the passageway of said checking and retaining means having a cross-dimension less than the maximum corresponding cross-dimension of said retainable means, with the result that during opening and closing movements of said door structure said retainable means is flexed or bowed in opposite directions while in such passageway.

9. A device for releasably holding or retaining a door structure in an open position relative to a frame structure, said device comprising retaining means adapted to be associated with one of such structures, and retainable means adapted to be associated with the other of such structures for releasable retention by said retaining means when the door structure is in an open position, one of such means being of flexible and resilient character and being flexed or bowed by the other of such means in one direction during opening movement of the door structure and in the opposite direction during cosing movement of the door structure.

10. A device for releasably holding or retaining a door structure in an open position relative to a frame structure, said device comprising retaining means adapted to be associated with one of such structures, an arm adapted to be associated with the other of such structures and to extend through such retaining means, and retainable means carried by said arm for releasable retention by said retaining means when the door structure is in an open position, one of such means being of flexible and resilient character and being flexed or bowed by the other of such means in one direction during opening movement of the door structure and in the opposite direction during closing movement of the door structure.

11. A device for checking the opening movement of a door structure and for releasably holding or retaining such door structure in an open position relative to a frame structure, said device comprising checking and retaining means adapted to be associated with one of such structures, and checking and retainable means adapted to be associated with the other of such structures for checking contact with said checking and retaining means in checking the opening movement of the door structure and for releasable retention by said checking and retaining means in releasably holding or retaining the door structure in an open position, one of such means being of flexible and resilient character and being flexed or bowed by the other of such means in one direction during opening movement of the door structure and in the opposite direction during closing movement of the door structure.

12. A device for releasably holding or retaining a door structure in an open position relative to a frame structure, said device comprising retaining means adapted to be associated with one of such structures, and retainable means adapted to be associated with the other of such structures for releasable retention by said retaining means when the door structure is in an open position, said retainable means being of flexible and resilient character and being flexed or bowed by said retaining means in one direction during opening movement of the door structure and in the opposite direction during closing movement of the door structure.

RUDOLPH I. SCHONITZER.